United States Patent
Ulasen et al.

(10) Patent No.: US 11,977,633 B2
(45) Date of Patent: May 7, 2024

(54) AUGMENTED MACHINE LEARNING MALWARE DETECTION BASED ON STATIC AND DYNAMIC ANALYSIS

(71) Applicant: Acronis International GmbH, Schaffhausen (CH)

(72) Inventors: Sergey Ulasen, Singapore (SG); Vladimir Strogov, Singapore (SG); Serguei Beloussov, Singapore (SG); Stanislav Protasov, Singapore (SG)

(73) Assignee: Acronis International GmbH, Schaffhausen (CH)

(*) Notice: Subject to any disclaimer, the term of this patent is extended or adjusted under 35 U.S.C. 154(b) by 92 days.

(21) Appl. No.: 17/646,130

(22) Filed: Dec. 27, 2021

(65) Prior Publication Data

US 2023/0205880 A1     Jun. 29, 2023

(51) Int. Cl.
*G06F 21/56*     (2013.01)
*G06F 21/53*     (2013.01)
*G06N 5/022*     (2023.01)

(52) U.S. Cl.
CPC ............ *G06F 21/565* (2013.01); *G06F 21/53* (2013.01); *G06F 21/566* (2013.01); *G06N 5/022* (2013.01); *G06F 2221/034* (2013.01)

(58) Field of Classification Search
CPC ...... G06F 21/565; G06F 21/53; G06F 21/566; G06F 21/56; G06F 21/562
See application file for complete search history.

(56) References Cited

U.S. PATENT DOCUMENTS

| | | | |
|---|---|---|---|
| 8,122,509 B1 | 2/2012 | Belov | |
| 8,401,982 B1 | 3/2013 | Satish et al. | |
| 8,775,333 B1 | 7/2014 | Zahn | |
| 9,483,644 B1* | 11/2016 | Paithane | G06F 16/128 |
| 10,880,328 B2 | 12/2020 | Farhady et al. | |
| 10,997,291 B2 | 5/2021 | Dhankhar et al. | |
| 2015/0096022 A1* | 4/2015 | Vincent | G06F 21/562 726/23 |
| 2016/0191550 A1* | 6/2016 | Ismael | H04L 63/1433 726/1 |
| 2019/0034632 A1 | 1/2019 | Tsao et al. | |
| 2019/0044964 A1 | 2/2019 | Chari et al. | |
| 2020/0082083 A1 | 3/2020 | Choi et al. | |
| 2020/0175152 A1 | 6/2020 | Xu et al. | |
| 2021/0200870 A1* | 7/2021 | Yavo | H04L 63/1416 |

OTHER PUBLICATIONS

Kapratwar, Ankita, "Static and Dynamic Analysis for Android Malware Detection" (2016). Master's Projects. 488. DOI: https://doi.org/10.31979/etd.za5p-mqce. (Year: 2016).*

(Continued)

*Primary Examiner* — Robert B Leung
(74) *Attorney, Agent, or Firm* — ESPE Legal Consultancy FZ-LLC (57) ABSTRACT

A system and method for malware detection uses static and dynamic analysis to augment a machine learning model. At the training step, static and dynamic features are extracted from training datasets and used to train a malware classification model. The malware classification model is used to classify unknown files based on verdicts from both static and dynamic models.

10 Claims, 5 Drawing Sheets

(56) References Cited

OTHER PUBLICATIONS

Chanajitt, R., Pfahringer, B., & Gomes, H. M. (Oct. 2021). Combining static and dynamic analysis to improve machine learning-based malware classification. In 2021 IEEE 8th International Conference on Data Science and Advanced Analytics (DSAA) (pp. 1-10). IEEE. (Year: 2021).*

Xue, D., Li, J., Lv, T., Wu, W. and Wang, J., 2019. Malware classification using probability scoring and machine learning. IEEE Access, 7, pp. 91641-91656. (Year: 2019).*

Kilgallon, S., De La Rosa, L. and Cavazos, J., Sep 2017. Improving the effectiveness and efficiency of dynamic malware analysis with machine learning. In 2017 Resilience Week (RWS) (pp. 30-36). IEEE. (Year: 2017).*

Shijo, P. V., and A. J. P. C. S. Salim. "Integrated static and dynamic analysis for malware detection." Procedia Computer Science 46 (2015): 804-811. (Year: 2015).*

R. Chanajitt, B. Pfahringer and H. M. Gomes, "Combining Static and Dynamic Analysis to Improve Machine Learning-based Malware Classification," 2021 IEEE 8th International Conference on Data Science and Advanced Analytics (DSAA), Porto, Portugal, 2021, pp. 1-10, doi: 10.1109/DSAA53316.2021.9564144. (Year: 2021).*

M.-Y. Su, J.-Y. Chang and K.-T. Fung, "Machine learning on merging static and dynamic features to identify malicious mobile apps," 2017 Ninth International Conference on Ubiquitous and Future Networks (ICUFN), Milan, Italy, 2017, pp. 863-867, doi: 10.1109/ICUFN.2017.7993923. (Year: 2017).*

Subash Poudyal: "PEFile Analysis: A Static Approach to Ransomware Analysis", Retrieved from the Internet: URL: https://www.researchgate.net/publication/336813424_PEFile_Analysis_A_Static_Approach_To_Ransomware_Analysis, (2019).

Joshua Cannell: "Five PE Analysis Tools Worth Looking at", Retrieved from the Internet: URL: https://www.malwarebytes.com/blog/news/2014/05/five-pe-analysis-tools-worth-looking-at, Posted: (2014).

Kaspersky: "Emulator", Retrieved from the Internet: URL: https://www.kaspersky.com/enterprise-security/wiki-section/products/emulator, (2023).

Kaspersky: "Sandbox", Retrieved from the Internet: URL: https://www.kaspersky.com/enterprise-security/wiki-section/products/sandbox, (2023).

Kaspersky: "System behavior analyzer", Retrieved from the Internet: URL: https://support.kaspersky.com/KESWin/10SP2/en-us/128012.htm, (2023).

Jaime Devesa: "Automatic Behaviour-based Analysis and Classification System for Malware Detection", Retrieved from the Internet: URL: https://www.researchgate.net/publication/220708645_Automatic_Behaviour-based_Analysis_and_Classification_System_for_Malware_Detection (2010).

* cited by examiner

AUGMENTED MACHINE LEARNING MALWARE DETECTION BASED ON STATIC AND DYNAMIC ANALYSIS

FIELD OF THE INVENTION

The invention pertains to the field of computer security, in particular the analysis of untrusted files and processes for malicious behavior.

BACKGROUND OF THE INVENTION

Malicious processes in computer systems can be detected using dynamic analysis and static analysis. Dynamic analysis, also called "behavior analysis" focuses on how an untrusted file or process acts. Static analysis, on the other hand, is concerned with what can be known about an untrusted file or process before runtime.

Static analysis and behavior analysis are perceived as very different approaches to malware detection. This limits the effectiveness of these tools to their own strengths. Behavior analysis, for example, although effective for detecting malware at runtime, lacks the depth of static analysis when used on its own. There is a need for more effective malware analysis tools that augment the usefulness of behavior analysis and static analysis.

SUMMARY OF THE INVENTION

Metadata from static analyzers are used during behavior analysis of an untrusted file or process. For example, static Portable Executable (PE) metadata is combined with behavioral tools such as stack traces and Application Programming Interface (API) calls sequences.

The invention comprises systems and methods for detecting and classifying malware in an unknown file on a target computing system. In an embodiment, a detection and classification method is executed on a processor associated with the target computing system comprising the following steps. First an unknown file is classified with a static analysis machine-learning model based on static features extracted from the file before execution. The verdict of static classification includes a rate of conformity to at least one class of files and a rate of at least one predicted dynamic feature. Then the file is executed on the target computing system. Alternatively, the target file is executed in a secure environment, such as a sandbox or isolated virtual machine. The secure environment preferably resembles the target computing system so that results in the secure environment are generally predictive of the target computing system.

The method continues with collecting data related to file execution on a target computing system. Dynamic features of a first and second dynamic feature sets are extracted from collected data. Feature sets contain dynamic features filtered using the rate of predicted dynamic features. For example, the feature is taken into a set when the rate exceeds a predefined threshold. The file is classified with a first dynamic analysis machine-learning model based on extracted dynamic features of the first dynamic feature set. The verdict of the first dynamic classification includes a rate of conformity to at least one class of files. The file is also classified using a second dynamic analysis machine-learning model based on extracted dynamic features of the second dynamic feature set. The verdict of the second dynamic classification also includes a rate of conformity to at least one class of files.

The file is then classified with a malware classification machine learning model based on the verdict of the static classification, the verdict of the first dynamic classification, and the verdict of the second dynamic classification. Classification may also be based on rates and predicted feature sets or ranks. The malware classification verdict is processed by an endpoint protection agent to detect malware. A detection response action is performed at the endpoint protection agent to counter the malware.

DETAILED DESCRIPTION

To improve malware detection, a constructed static model is supplemented with the functions of a behavioral analyzer. The static model is built independently of behavioral attributes and creates added helper functions that identify malicious and safe files with the required accuracy.

To further improve detection, the dynamic model is built as if nothing is known about the static data. After being created in the training process, the dynamic model is supplemented with auxiliary attributes of the static analyzer. This approach improves the accuracy of the dynamic analyzer and reduces the number of false positives.

While processing files and processes, the static analyzer and the dynamic analyzer fill a feature table for system objects. These tables are used to build a machine learning model for detecting threats.

Features in this context refer to input variables used in making predictions. Examples of static features include byte n-grams and opcode n-grams. Static features also include strings. String features are based on plain text encoded into executables. Examples of strings found in a Microsoft Windows environment include "windows," "getversion," "getstartupinfo," "getmodulefilename," "message box," "library," and so on. Static features may also be extracted from .exe files. For example, data from a PE header describes the physical and logical structure of a PE binary. Dynamic features are extracted during runtime of an unknown file. Such features are generally function based, such as stack traces, API calls, instruction sets, control flow graphing, function parameter analysis, and system calls.

A machine learning model refers to a file that has been trained to recognize patterns by being passed a training dataset and being provided an algorithm that can be used to analyze and learn from that training dataset. For a supervised learning model, the training dataset includes labels. These labels correspond to the output of the algorithm. A typical model attempts to apply correct labels for the data by applying an algorithm. For example, when the training dataset comprises files to be classified, a predicted label for a given file is calculated. These calculations are then compared to the actual label for that file. The degree of error, the variation between the predicted label and the actual label, is calculated by way of another algorithm, such as a loss function. By repeated attempts (epochs) at classifying the training data, the model will iteratively improve its accuracy. When the accuracy of the model on the training data is optimal, the trained machine learning model can then be used to analyze testing data. Optimization in this context refers to a model that is trained to classify the test data with an acceptable level of accuracy but not overtrained to the point that the model is so sensitive to idiosyncrasies in the training dataset that testing dataset results suffer. Testing data refers to data that has not been seen before.

Modules in this context refer to a file containing a set of functions, arrays, dictionaries, objects, and so on. In the Python language, for example, a module is created by saving program code in a file with the extension .py.

The results of classification by a machine learning model depend on the classification task. For example, in malware detection the task is to determine whether an unknown file is malware or not. To simplify calculations, the strings "malware" and "not malware" are converted to integers. In this context, the label "0" can be assigned to "not malware" and the label "1" can be assigned to "malware." A suitable algorithm for binary classification is then chosen. Some examples of such algorithms include logistic regression, k-nearest neighbors, decision trees, support vector machines, or Bayesian networks. Alternatively, neural networks may be chosen, including neural networks configured for binary classification. Or clustering algorithms, such as K-means clustering, may be used to identify multiple classes. In this embodiment, each class represents a threat family.

Figure 1:
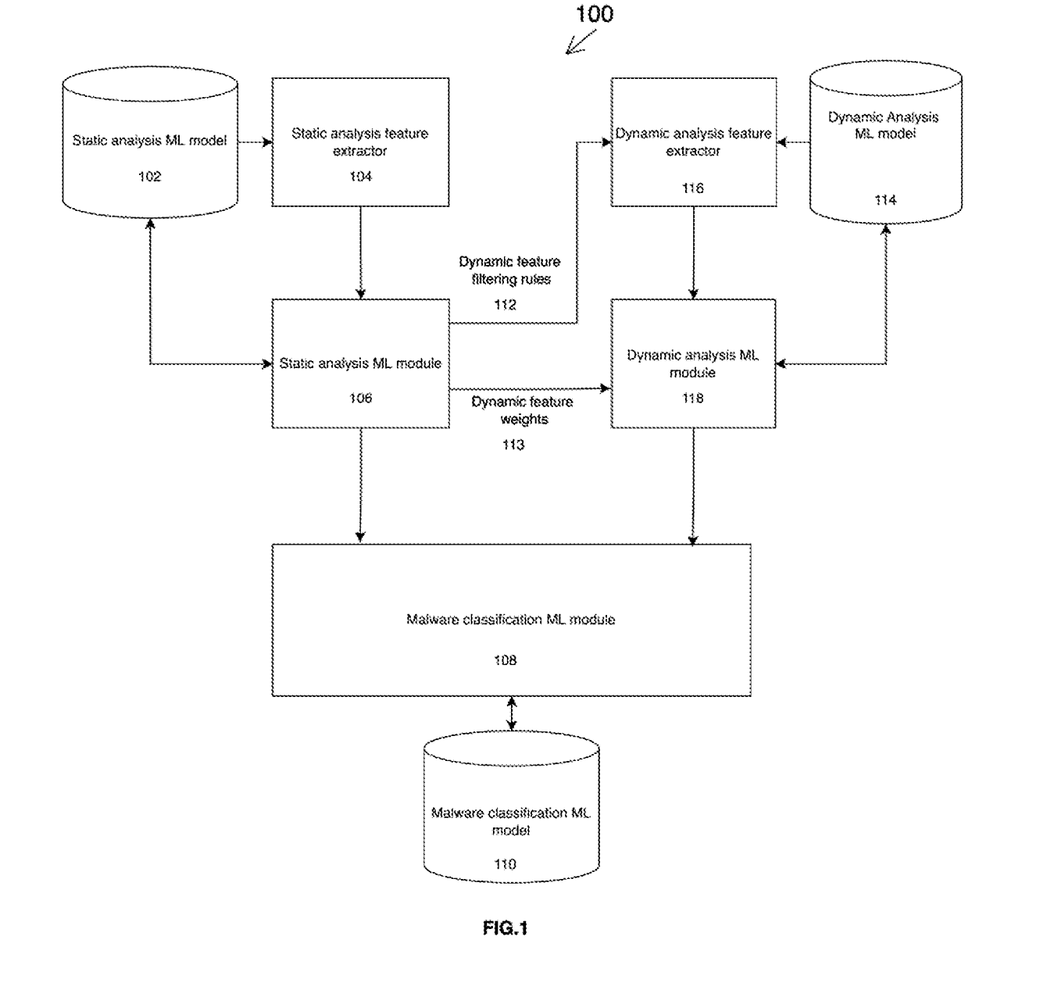
FIG. 1 shows a system configuration for creating a malware classification model in accordance with the invention.

FIG. 1 shows system 100, which combines static and dynamic analysis models to create a malware classification model. Static analysis machine learning ("ML") model 102 is linked with static analysis feature extractor 104 and static analysis ML module 106. Static ML module 106 is configured to pass the results of static analysis to malware classification ML module 108 and the results are stored as malware classification ML model 110. The static analysis module 106 is connected to dynamic analysis components by way of dynamic feature filtering rules 112 and dynamic feature weights 113. Dynamic analysis ML model 114 is linked with dynamic analysis feature extractor 116 and dynamic analysis ML module 118. Dynamic analysis ML module 118 is configured to pass the results of dynamic analysis to malware classification module 108. This malware classification module 108 is configured to be saved as malware classification machine learning model 110.

Static analysis module 106 stores rules from static analysis and passes one or more of these rules for use as dynamic feature filtering rules 112 to dynamic analysis feature extractor 116. Static analysis ML module 106 also stores feature weights from static analysis and passes these weights as dynamic feature weights 113 to dynamic analysis ML module 118. Filtering rules 112 are rules used by dynamic feature extractor 116 to identify relevant features to use as inputs for classification. Dynamic feature weights 113 refer to the coefficients applied to each dynamic feature when predicting file labels. Machine learning models improve their accuracy in training by adjusting the coefficients applied to various features. For example, if there are two given features A and B that are predictive of a malware label, training may reveal that A is more strongly correlated with that label than feature B. Accordingly, feature A will be given greater weight in training the model to accurately predict the malware label.

Figure 2:
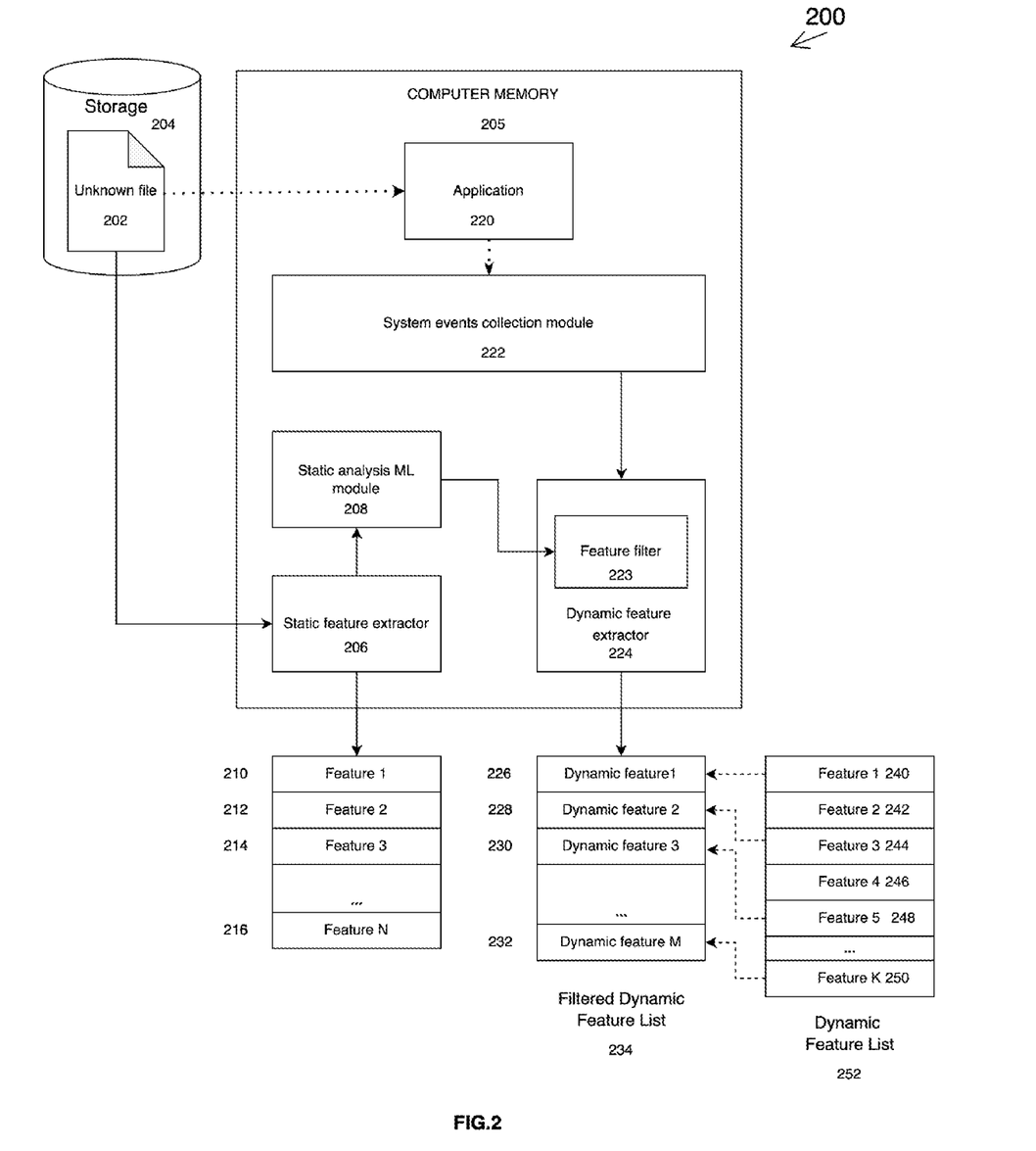
FIG. 2 shows a system configuration for feature extraction comprising dynamic and static analysis.

As shown in FIG. 2, system 200 is directed to analysis of unknown file 202 in storage medium 204. Static feature extractor 206 extracts features 1-N (210, 212, 214, and 216). Unknown file 202 is also loaded into computer memory 205 and executed by way of application 220. System events from application 220 are recorded by system events collection module 222. Dynamic feature extractor 224 identifies dynamic features 1-M (226, 228, 230, and 232), which comprise filtered dynamic feature list 234. These filtered dynamic features are a subset of a larger set of features. In FIG. 2, for example, the features 1-K represent unfiltered features 240, 242, 244, 246, 248, and 250, which comprise dynamic feature list 252. In this example, feature 1 (240) corresponds to filtered feature 1 (226), feature 3 (244) corresponds to filtered feature 2 (228), and feature 5 (248) corresponds to filtered feature 3 (230). Feature 2 (242) and feature 4 (246) have been removed from the feature list as a result of filtering. Dynamic features may be of multiple types. For example, these features may include stack traces, API calls, system calls, and so on.

Figure 3A:
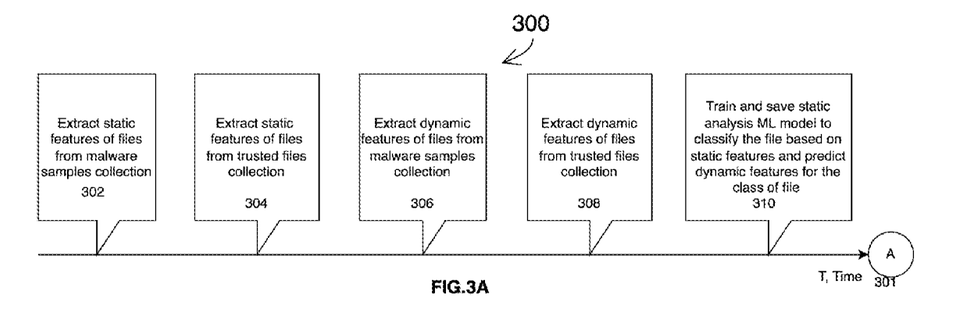
FIGS. 3A, 3B, and 3C show a timeline of steps implementing a method of malware classification in accordance with the invention.
Figure 3B:
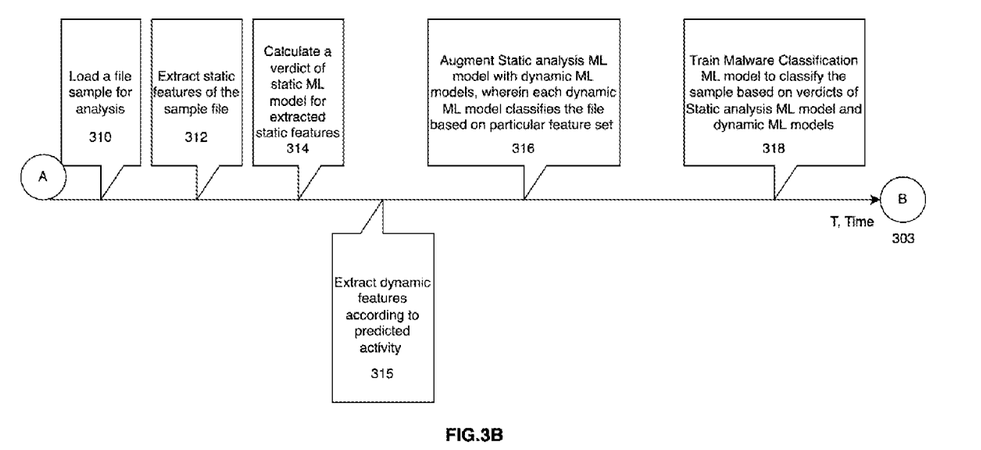
Figure 3C:
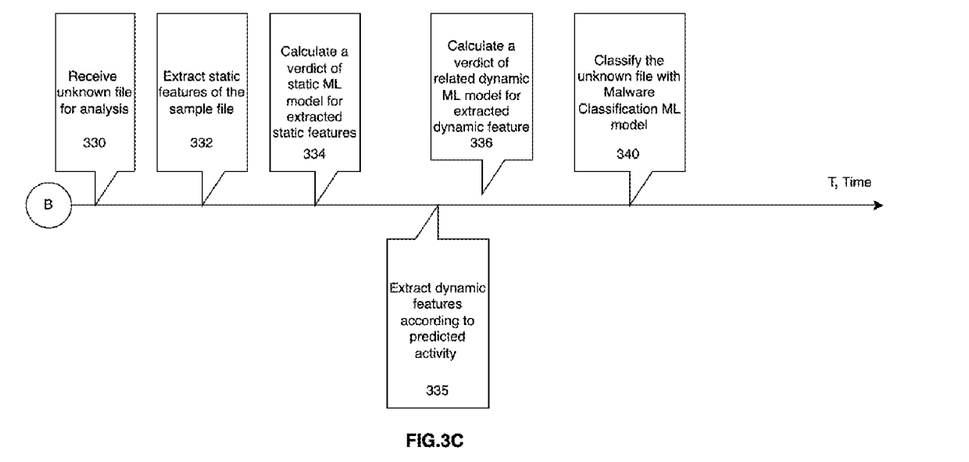

FIGS. 3A, 3B, and 3C show method 300 and its steps performed over some time, T. FIG. 3A shows a first timeline A (301) where static features of files are extracted from a malware sample files collection at step 302. Then static features are extracted from a collection of trusted files as step 304. At step 306, dynamic file features are extracted from a malware samples collection. Static file features from a trusted file collection are extracted at step 308. Static features and dynamic features for the file class are used to train and save a static analysis machine learning model at step 310.

FIG. 3B continues the timeline of FIG. 3A from point A (301) to point B (303). First, a file sample is loaded for analysis at step 310. Then static features from the file sample are extracted at step 312. At step 314, a static machine learning model verdict is calculated for the extracted static features. Next, dynamic features are extracted from the file sample at step 315 in accordance with predicted activity. Then the static analysis machine learning model is augmented with a dynamic machine learning model at step 316. Each dynamic machine learning model classifies the file based on a particular feature set. Based on the verdicts of the static analysis machine learning model and the dynamic machine learning models, a malware classification model is trained to classify the sample at step 318.

FIG. 3C focuses on classification of an unknown file that has been received for analysis at step 330 starting from point B (303) on the timeline. Static features are extracted from the sample file at step 332. Then the static machine learning model's verdict is calculated for the extracted static features at step 334. Dynamic features are then extracted at step 335 according to predicted activity. The related dynamic machine learning model calculates a verdict for the extracted dynamic features at step 336. The unknown file is then classified with the malware classification machine learning model at step 340.

Figure 4:
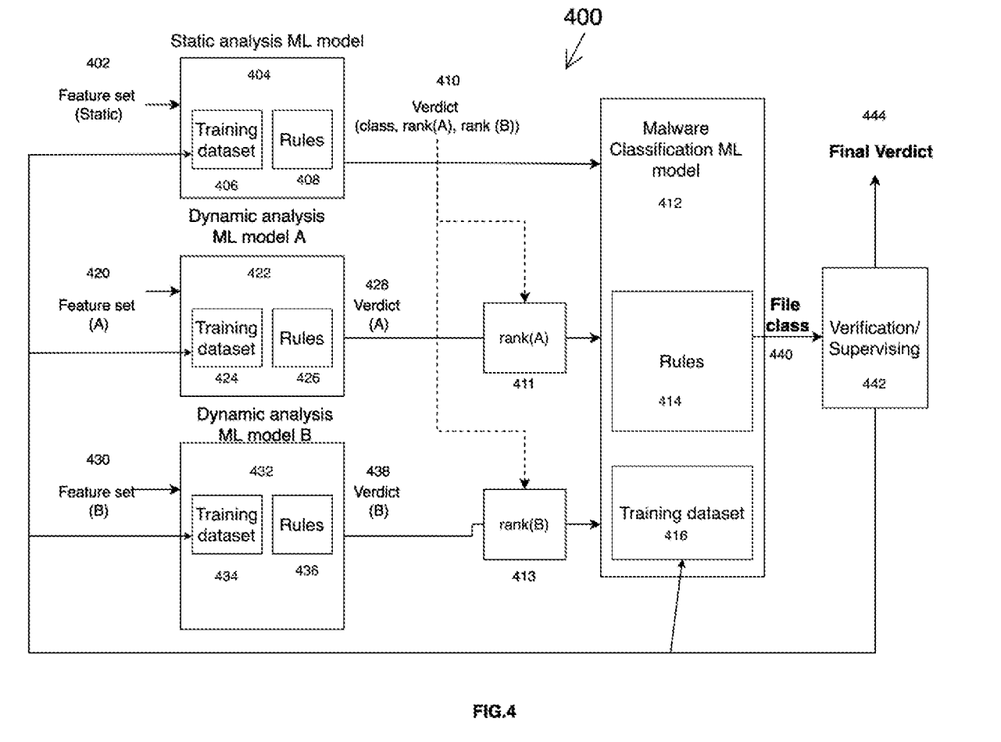
FIG. 4 shows a system configuration for reaching a verdict about an unknown file in accordance with the invention.

FIG. 4 shows system 400 for malware classification. Feature set 402 comprises static features, which are configured for passing to static analysis machine learning model 404. The static analysis machine learning model 404 comprises training dataset 406 and rules 408. For a given file, static analysis machine learning model 404 classifies a file and renders a verdict 410 based on static features. This verdict 410 comprises one or more classes. For example, a model trained for binary classification of files being analyzed for malware could classify a file as either "not malware" ("0") or "malware" ("1"). Alternatively, files may be classified by their probability in matching multiple class labels. For example, the class labels are Trojan Horse, ransomware, viruses, or clean files. Each class will be characterized by different static and dynamic features, so if the static machine learning model determines that an unknown file is Trojan with some rate of confidence, then it will also output probabilities for expected dynamic features. The verdict 410 further comprises ranked features, such as strongly correlated features of rank(A) and less strongly correlated features of rank(B). In this context, correlated features of rank(A) refer to the weights calculated by static analysis for the most relevant features. Features of rank(B) refer to the weights calculated by static analysis for features that are less strongly related to the verdict. These rank indicators are configured to be passed to malware classification model 412, which comprises rules 414 and training dataset 416. Rank(A) 411 and rank(B) 413 features are applied to dynamic analysis verdicts as explained below.

Malware classification machine learning model 412 also receives verdicts from dynamic analysis of the given file. Feature set A 420 comprises features of a first type. These features are configured for passing to dynamic analysis machine learning model A 422. The dynamic analysis machine learning model A 422 comprises a training dataset 424 and rules 426. For a given file, machine learning model 422 outputs a verdict A 428. This verdict 428 is augmented with rank(A) features passed from static analysis verdict 410 before being passed to malware classification machine learning model 412. A second feature set B 430 comprises features of a second type. These features are configured for passing to dynamic analysis machine learning model B 432. The dynamic analysis machine learning model B 432 comprises a training dataset 434 and rules 436. For a given file, machine learning model 432 outputs a verdict B 438. This verdict 438 is augmented with rank(B) features passed from static analysis verdict 410 before being passed to malware classification machine learning model 412. Rank(A) and rank(B) features refer to features that have been determined through static analysis to have different relative weights for predicting class labels of interest, such as "not malware" and "malware." For example, features of rank(A) are more strongly associated with a particular class label while features of rank(B) are more weakly associated with a class label.

Having received verdicts 410, 428, and 438 with respect to a given file, malware classification model 412 is configured to classify the file and pass this classification 440 to a verification and supervising process 442. This process 442 is configured to output a final verdict 444 with respect to the unknown file. In an embodiment, final verdict 444 is added to the training datasets for the malware classification model 412.

Figure 5:
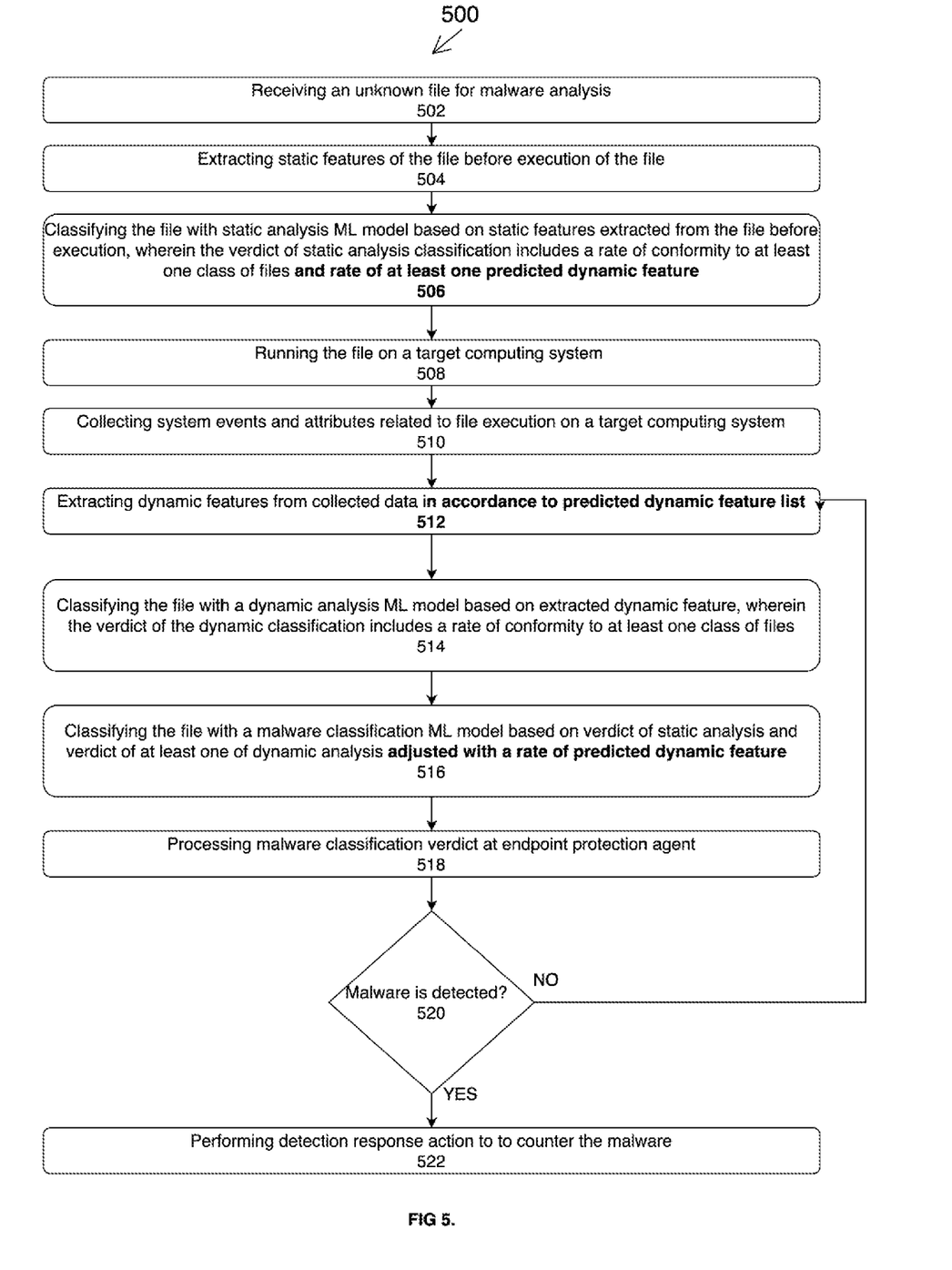
FIG. 5 shows method steps for detecting the presence of malware in an unknown file in accordance with the invention.

FIG. 5 shows method 500, which starts at step 502 with receiving an unknown file for malware analysis. At step 504 static features of the file are extracted before the file is executed. At step 506, the file is classified with a static analysis machine learning model based on static features extracted from the file before execution. The verdict of static analysis classification includes a rate of conformity to at least one class of files and rate of at least one predicted dynamic feature. At step 508 the file is executed (run) on the target computing system. Systems events and attributes related to file execution on a target computing system are collected at step 510. The method continues with extracting dynamic features of a first dynamic feature set during execution of the file at step 512 in accordance with a predicted dynamic features list. At step 514, the file is classified with a dynamic analysis machine learning model based on extracted dynamic features. The classification verdict at step 514 includes a rate of conformity to at least one class of files. At step 516, the file is classified with a malware classification machine learning model based on a verdict of static analysis and a verdict of at least one dynamic analysis adjusted with a rate of a predicted dynamic feature. The result of step 516 is passed to an endpoint protection agent for processing a malware classification verdict at step 518. A classification is reached at step 520 that determines whether the file is malware or not. If not, the method loops back to step 512 and repeats steps 512-520. If malware is detected at step 520, then a detection response action is performed at step 522 to counter the malware.

The invention claimed is:

1. A computer implemented method for adjusted machine-learning malware detection based on static and dynamic analysis of a file, the method executed on a processor of a target computing system, the method comprising:
classifying the file with a static analysis machine learning model based on static features extracted from the file before execution, wherein classifying the file comprises obtaining a first verdict with a rate of conformity to a class of files and a rate of a predicted dynamic feature;
executing the file on the target computing system;
collecting data related to file execution on the target computing system;
extracting the predicted dynamic feature from the collected data;
classifying the file with a dynamic analysis machine learning model based on the predicted dynamic feature, wherein classifying the file comprises obtaining a second verdict with a rate of conformity to a class of files and wherein the second verdict is adjusted with the rate of the predicted dynamic feature; and
classifying the file with a malware classification machine learning model based on the first verdict of the static analysis machine learning model and the second verdict of the dynamic analysis machine learning model.

2. The method of claim 1, further comprising the step of processing a malware classification verdict at an endpoint protection agent to detect malware, wherein the step of processing occurs after classifying the file with a malware classification machine learning model.

3. The method of claim 2 wherein the target computing system comprises a sandbox for securely executing the file.

4. The method of claim 2, further comprising the step of performing a detection response action at the endpoint protection agent to counter the malware.

5. The method of claim 4 wherein the target computing system comprises a sandbox for securely executing the file.

6. A system for adjusted machine learning malware detection comprising:
a processor coupled to a storage device configured for training and storing a plurality of machine learning models;
a static analysis machine learning model configured to extract static features from a file before execution and to classify the file based on extracted static features, wherein the file classification comprises a first verdict with a rate of conformity to at least one class of files and a rate of a predicted dynamic feature;
a target computing system for executing the file;
collected data related to the file's execution on the target computing system;

dynamic features from the collected data extracted in accordance to a predicted dynamic feature list comprising the predicted dynamic feature;

a dynamic analysis machine learning model configured to classify the file based on the extracted dynamic features, wherein the file classification results in a second verdict comprising a rate of conformity to a class of files and adjusted with the rate of the predicted dynamic feature; and a malware classification machine learning model configured to classify the file based on the first verdict of the static analysis machine learning model and the second verdict of the dynamic analysis machine learning model.

7. The system of claim 6, wherein the target computing system for running the file comprises a sandbox for securely executing the file.

8. A computer implemented method for adjusted machine-learning malware detection based on static and dynamic analysis of the file, the method executed on a processor of a target computing system, the method comprising:

classifying a file with a static analysis machine learning model based on static features extracted from the file before execution, wherein the classification results in a first verdict comprising a rate of conformity to a class of files and a rate of first and second predicted dynamic features;

executing the file on the target computing system;

collecting data related to file execution on the target computing system;

extracting dynamic features from collected data in accordance with a predicted dynamic feature list to create a first dynamic features dataset;

wherein the predicted dynamic feature list comprises first and second predicted dynamic features;

wherein the first predicted dynamic feature has a first weight and the second predicted dynamic feature has a second weight;

extracting dynamic features from collected data to create a second dynamic features dataset;

training a first dynamic analysis machine learning model using the first dynamic features dataset and training a second dynamic analysis machine learning model using the second dynamic features dataset;

classifying the file with the first dynamic analysis machine learning model, wherein the classification results in a second verdict adjusted with the rate of the first predicted dynamic feature;

classifying the file with the second dynamic analysis machine learning model, wherein the classification results in a third verdict adjusted with the rate of the second predicted dynamic feature; and classifying the file with a malware classification machine learning model based on the first and second and third verdicts.

9. The method of claim 8, wherein the the step of classifying the file with a malware classification machine learning model further comprises ranking the verdicts of the first and second dynamic analysis machine learning models with the rate of the predicted dynamic feature.

10. The method of claim 8, wherein the first verdict includes a rate of a plurality of predicted dynamic features.

* * * * *